Nov. 28, 1961   R. S. GEOCARIS   3,010,378
LIGHTING AND VENTILATING SYSTEM
Filed Oct. 22, 1959   3 Sheets-Sheet 1
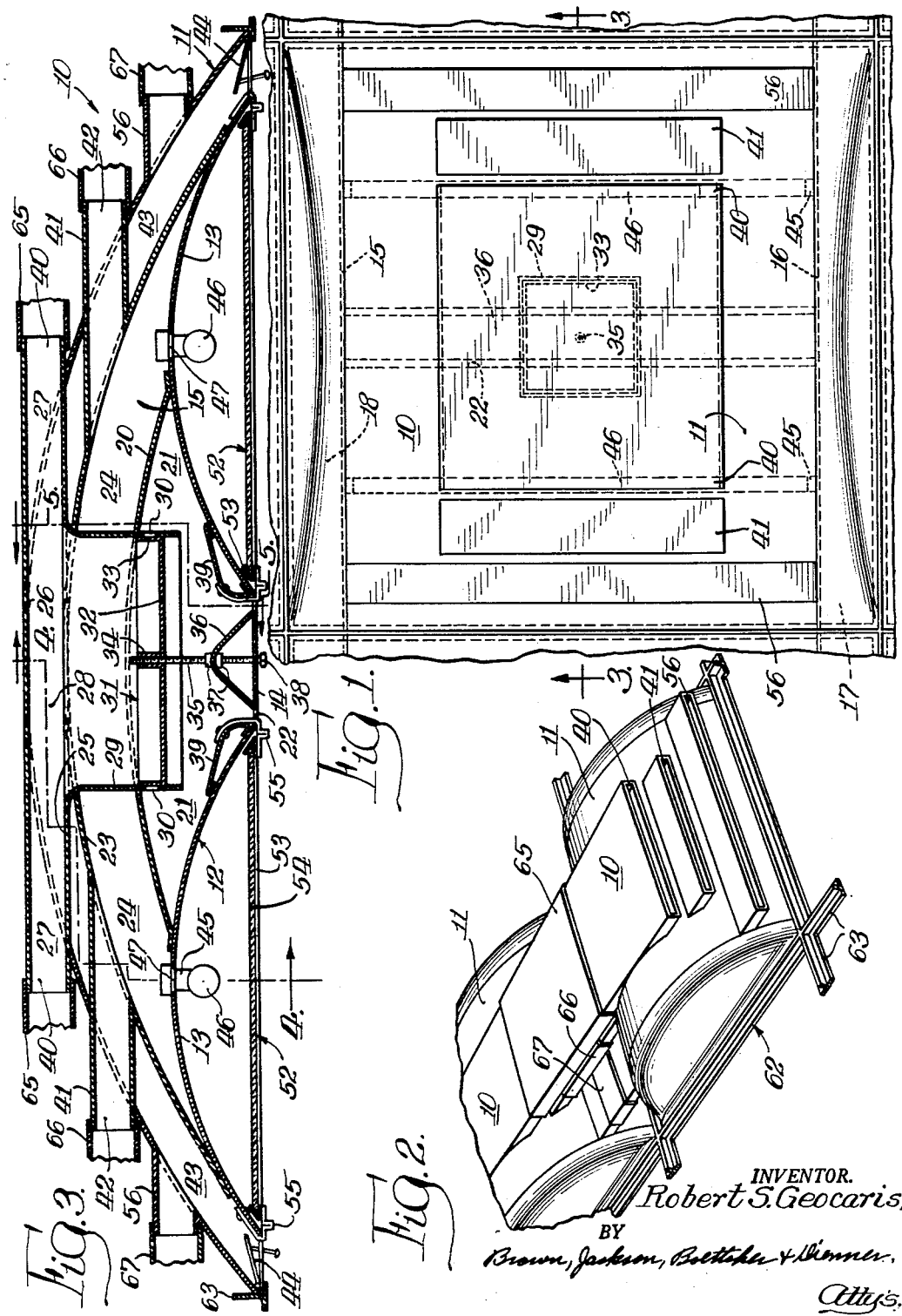
INVENTOR.
Robert S. Geocaris,
BY
Brown, Jackson, Boettcher & Dienner,
Attys.

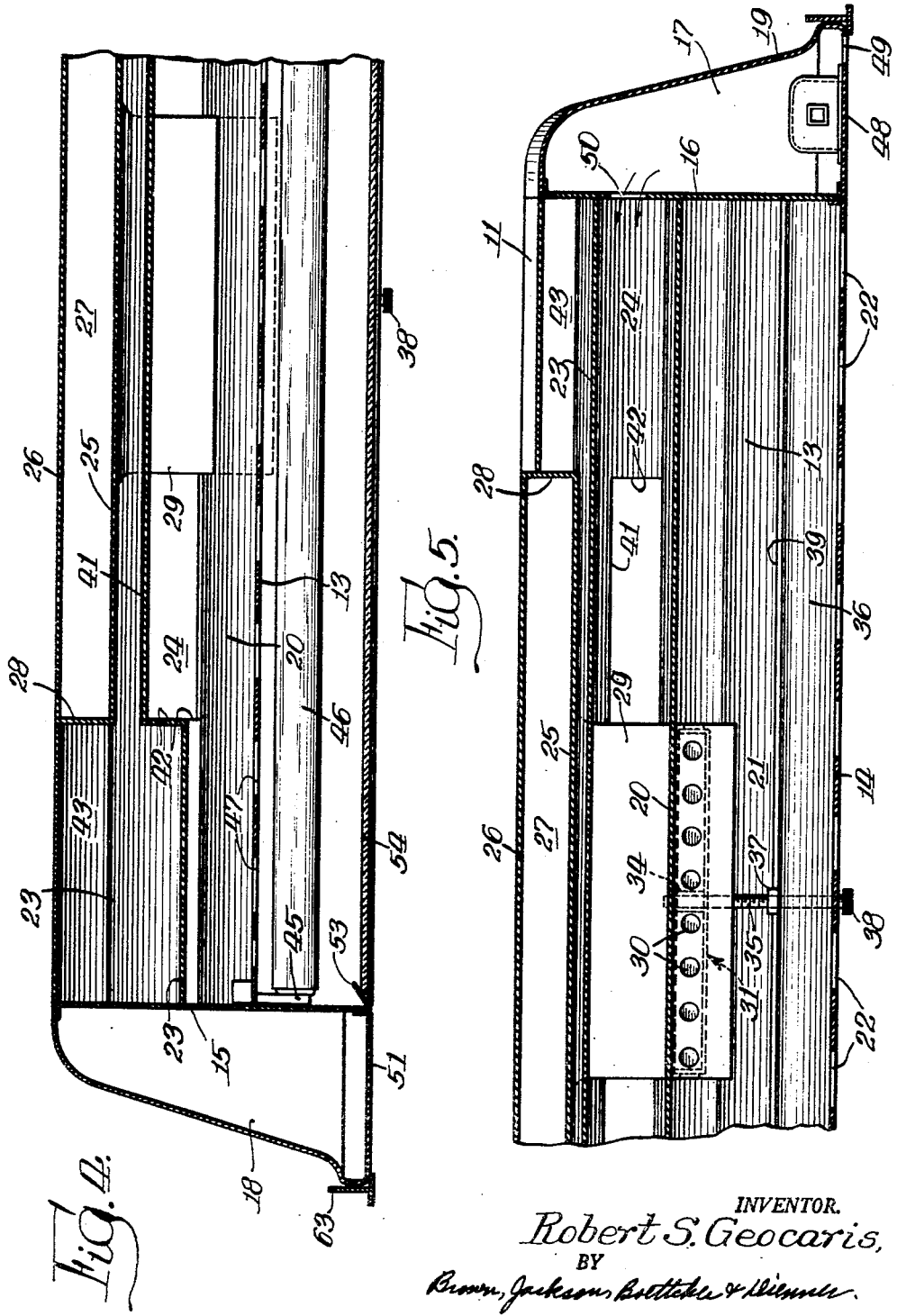

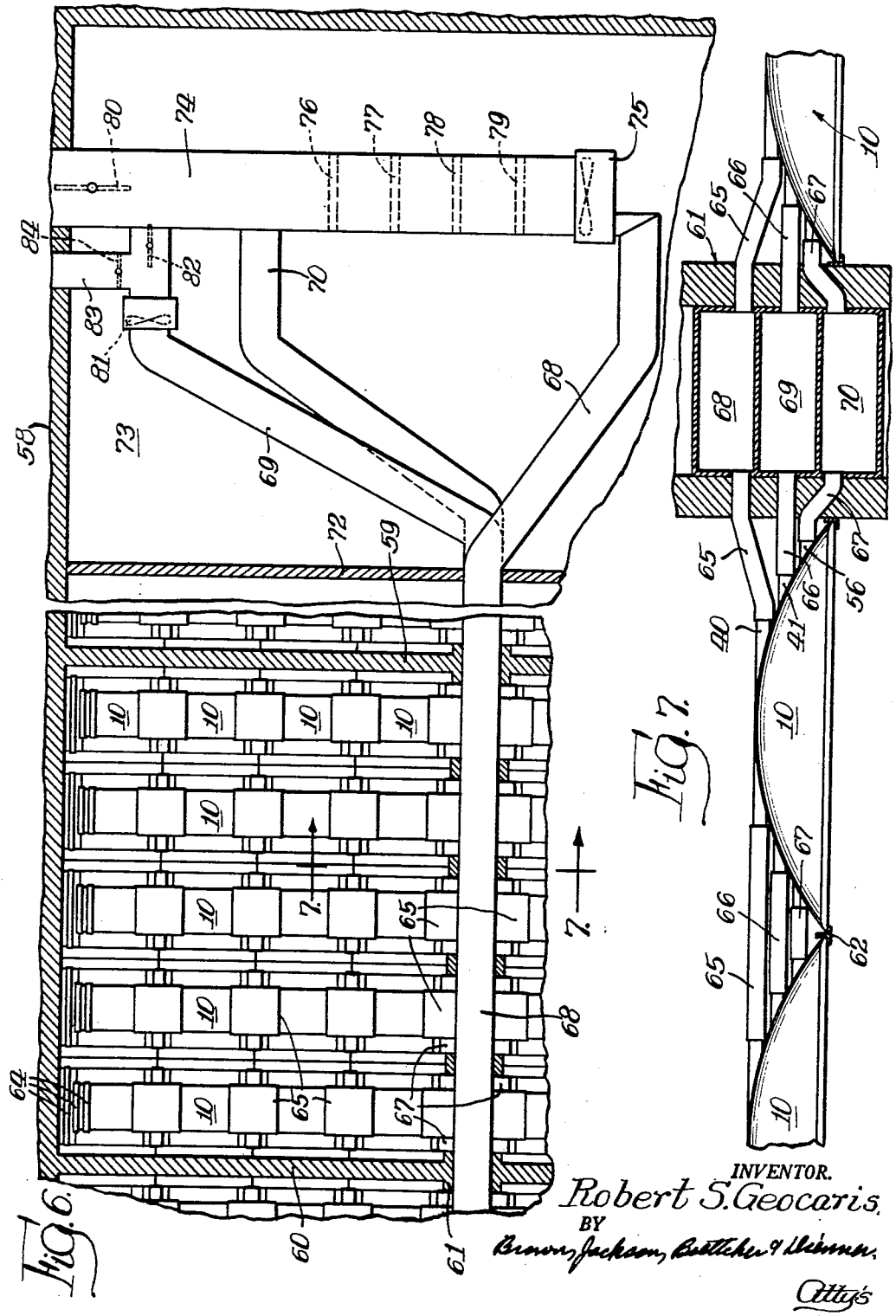

United States Patent Office 3,010,378
Patented Nov. 28, 1961

3,010,378
LIGHTING AND VENTILATING SYSTEM
Robert S. Geocaris, Broadview, Ill., assignor, by mesne assignments, to Thomas Industries, Inc., Louisville, Ky., a corporation of Delaware
Filed Oct. 22, 1959, Ser. No. 848,132
13 Claims. (Cl. 98—33)

This invention relates to lighting and ventilating systems, and has to do with such system utilizing fixtures or units particularly adapted for use in ceiling structures for illuminating rooms or like spaces while also providing for ventilation and air conditioning thereof.

The fixtures of my invention are provided with passages and openings so related that when a plurality of such fixtures are appropriately arranged they provide a ceiling structure of neat and attractive appearance. The ceiling structure thus produced is of such character that the heat generated by the light sources or lamps and accessories of the fixtures may be conserved for heating purposes in cold weather, and may be discharged to atmosphere in warm weather, by supplementary means appropriately connected to the ceiling structure. The ceiling structure and the supplementary means together further provide for withdrawing air from the room or space being air conditioned and either heating or cooling such withdrawn air and returning it to the room with the addition of outside or atmospheric air if desired or as conditions may require. Further, the air heated by the lamps and ballast or other accessories may be returned to the room in cold weather, contributing substantially to heating thereof and thus materially reducing heating costs, or may be discharged to atmosphere in warm weather thereby substantially reducing the cost of cooling the air supplied to the room for air conditioning thereof. The system and the fixtures of my invention thus effect a substantial saving in heating costs in cold weather and in cooling costs for air conditioning in warm weather, while also eliminating necessity for a finished upper or main ceiling, thereby effecting a further and substantial cost in construction. Further objects and advantages of my invention will appear from the detail description.

In the drawings:

FIGURE 1 is a top plan view of one of the units or fixtures used in the ceiling structure of my invention, adjacent fixtures and the fixture supporting grid being shown fragmentarily;

FIGURE 2 is a perspective view of two adjacent fixtures of the ceiling structure disposed side by side, with one of the fixtures and the supporting grid shown fragmentarily;

FIGURE 3 is a transverse sectional view, on an enlarged scale, of one of the fixtures, taken substantially on line 3—3 of FIGURE 1, certain parts being shown in elevation;

FIGURE 4 is a lengthwise section view, partly broken away and on an enlarged scale, taken substantially on line 4—4 of FIGURE 3;

FIGURE 5 is a view similar to FIGURE 4 but taken substantially on line 5—5 of FIGURE 3;

FIGURE 6 is a schematic view of the lighting and ventilating system of my invention installed in a building, the ceiling structure being shown in top plan view and the walls of the building being shown in transverse section; and FIGURE 7 is a sectional view, on an enlarged scale, taken substantially on line 7—7 of FIGURE 6.

The ceiling structure of my invention comprises a plurality of lighting and ventilating units or fixtures 10 preferably constructed as shown in FIGURES 1 to 5, inclusive. Each of the fixtures 10 comprises a housing 11 formed of any suitable material, conveniently sheet metal, and of any suitable shape and cross section. The housing 11 is shown, by way of example, as being approximately square in plan and preferably, though not necessarily, of domed or arcuate cross section, as illustrated in FIGURE 3. The housing 11 is provided interiorly with partition members, to be referred to more fully presently, and has mounted therein a downwardly opening reflector structure 12 which may comprise two reflector members 13 preferably, though not necessarily, of domed or arcuate cross section connected together at their inner sides by a flat finishing strip 14. The reflector structure 12, like the housing 11, may be formed of any suitable material, conveniently sheet metal and may be of any suitable shape and cross section. The inner or under surfaces of the members 13 are appropriately finished to provide light reflecting surfaces, the under surface of strip 14 being appropriately finished to provide a neat and attractive appearance. The reflector structure 12 is of materially less width than the housing 11 and is spaced from the sides thereof as shown. Transverse partition members 15 and 16 extend across the housing 11 a short distance from the ends thereof providing two end compartments 17 and 18. One of the compartments, such as the compartment 17, may contain ballast 19 used in conjunction with the light sources or lamps, assuming the latter to be fluorescent tubes, which are preferred but are not essential to the broader concept of my invention. The compartments 17 and 18 also may accommodate other accessories which it may be desired to incorporate in the fixture. The reflector shell structure 12 extends between and is secured to the partition members 15 and 16, the latter providing closures from the end of the shell, as will be understood.

A lower lengthwise partition member 20 of arcuate cross section extends between the end partition members 15 and 16 and overlies the finishing strip 14 and the inner portions of the reflector members 13, defining therewith a centrally disposed lengthwise air supply chamber 21 closed at its ends by the partition members 15 and 16. The chamber 21 opens into the space underlying finishing strip 14 through suitably disposed slots or openings therein at the sides thereof. A second lengthwise partition member 23, also of arcuate cross section, extends between the end partition members 15 and 16 and is disposed between partition member 20 and the domed wall of housing 11, partition member 23 overlying the outer side portions of the reflector members 13 beyond partition member 20 and defining with the latter a transverse passage 24 closed at its ends by the partition members 15 and 16, the side marginal portions of partition 23 seating on and being secured to the reflector members 13, in any suitable known manner, in air tight sealing contact therewith. The housing structure is further provided with a horizontal transverse partition member 25 adjacent the upper portion of partition member 23, and with a flat top wall 26 of substantial width spaced above and defining with partition member 25 an air supply passage 27 closed at its ends by end walls 28 spaced inward a substantial distance from the transverse partitions 15 and 16. The partition member 25 has at its central portion a collar 29 extending downward through the partition members 23 and 25 in air tight sealing contact therewith, and into the air supply chamber 21.

The collar 29 provides a well for delivering air to the chamber 21, as will be understood. Collar 29 is provided with a plurality of openings 30 disposed below the partition member 20. A cup shaped valve member 31 fits snugly within collar 29 and is provided with an imperforate bottom wall 32 and an upwardly extending flange 33 seating snugly against the inner face of the surrounding wall of collar 28. The flange 31 is of a width or height effective for closing the openings 30 when the valve member 31 is in its position shown in FIGURE 3. The valve member 31 is provided with a central vertical sleeve or hub 34 which receives an adjusting screw 35 threaded therethrough. The screw 35 passes through the finishing strip 14 and through a deflector strip 36 of approximately inverted V-shape in cross section extending between the end partition members 15 and 16 and seating on the upper face of strip 14 at the inner sides of the slots or openings 22 therein. The screw 35 is restrained against endwise movement by collars 37 secured thereon in a suitable manner, conveniently by set screws, disposed at the upper and the lower faces of the deflector strip 36 at the vertex thereof. The screw 35 extends an appreciable distance below strip 14 and is provided at its lower end with a knurled head 38 for convenience in turning screw 35 in desired direction. As will be understood from what has been said, by turning the screw 35 in proper direction the valve member 31 may be adjusted to uncover the openings 30 for admitting air to variable extent to the air supply chamber 21, or may be moved to its closed position shown in FIGURE 3, as desired. Preferably, though not necessarily, deflector strips 39, of arcuate cross section at their inner portions are mounted on the upper faces of the inner sides of the reflector members 13 defining, with the deflector strip 36, downwardly converging passages leading to the openings 22 for discharge of air downward therethrough, the strips 39 extending between the transverse partition members 15 and 16 and seating at their ends thereagainst. As is shown more clearly in FIGURE 1, the wall member or collar 28 is approximately square in cross section, to restrain the valve member 31 against relative turning movement, though the well member and the valve member may be of any suitable form. Within the broader concept of my invention, any suitable means may be provided for controlling the flow of air from air passage 27 to the room or space to be air conditioned, as will be understood.

The ends of the flat top wall 26 of housing 11 are spaced a substantial distance inward from the transverse end partition walls 15 and 16 and are joined by end walls 28 to the partition member 25 to provide the air supply passage 27, as above. The flat top wall 26 and the partition member 25 are extended through the sides of the upper portion of housing 11 to provide at each side thereof a duct 40 closed at its ends by extensions of the end walls 28. Similar ducts 41, having end walls 42, extend through the sides of the housing 11 a short distance below ducts 40, the ducts 41 opening into the passage 24 and the end walls 42 of ducts 41 being spaced a substantial distance inward from the transverse end partition members 15 and 16. The space between housing 11 and the partition member 23 provides a room air return passage 43 the ends of which open between the lower side edges of housing 11 and the lower side edges of the reflector structure 12, as shown in FIGURE 3. Preferably, the openings at the lower ends of passage 43 are controlled by adjustable dampers 44 of suitable known type. When the dampers 44 are open, room air may flow through passage 43 from either end thereof and about the ducts 41 and 40 and the air supply passage 27, the passage 43 extending between the transverse end partition members 15 and 16 and being closed at its ends thereby, as will be understood.

Each of the reflector members 13 is provided at the top and each end thereof with a socket member 45, there being a lamp, preferably a fluorescent tube 46, mounted in the sockets 45. Each of the reflector members 13 is also provided with a plurality of elongated openings or slots 47 (FIGURE 4) overlying the tube 46 and opening into the passage 24. It will be understood, of course, that any suitable number of tubes 46 may be provided in conjunction with suitably located openings in the reflector members 13 for admitting lamp heated air to the passage 24. As previously noted, a lamp ballast 19 (FIGURE 5) may be mounted in the end compartment 17, the lower end of which is closed by a bottom flange 48 except for an air admission open 49 therein. The end cross partition member 16 also is provided with an opening 50 at the corresponding end of passage 24 for admitting thereto air heated by the ballast 19. The bottom of compartment 18 is also closed by a bottom flange 51 (FIGURE 4), it being understood that flange 51 may likewise be provided with an air admission opening, in the event it has therein heat generating accessories to the fixture, in which case the end partition member 15 would also be provided with an opening corresponding to opening 50 in cross partition member 16. Each of the reflector members 13 is provided with a closure member or door 52 comprising an angle frame 53 and a panel 54 mounted therein, the panel 54 being formed of glass or other suitable material appropriately treated to diffuse uniformly the light of the lamp or tube 46. It will be understood that the tubes or lamps may be of any suitable type, fluorescent lamps being shown by way of example. The doors 52 are held in position in a suitable manner, conveniently by means of spring holders 55 secured to the outer sides of the reflector memers 13 and to the air deflector strips 39, such holders being spaced apart lengthwise of the doors 50 and having supporting fingers normally underlying the frames 53 thereof. The housing 11 is provided at each side thereof with a lower duct 56 which may extend the full length of passage 43 and is of materially greater length than the ducts 41 and 40.

In FIGURES 6 and 7 there is shown semi-diagrammatically a lighting and ventilating system embodying my invention and comprising a ceiling structure formed of units or fixtures 10 constructed as above disclosed. The system is shown as installed in a building having an exterior wall 58 and interior partitions 59, 60 and 61 providing adjacent rooms each measuring approximately 25 feet by 20 feet, it being assumed, for purposes of description, that the fixtures or units 10 are approximately five feet square. The fixtures are supported by a grid structure 62 comprising a plurality of members 63 of inverted T-cross section defining squares each of which receives one of the fixtures 10. The grid structure 62 is suitably supported by wires or hangers from an overlying floor or similar structure, in any suitable known manner. The fixtures 10 of a room ceiling are supported by the grid structure 62 in five rows arranged end to end, the fixtures of each row being arranged side to side and providing with the grid structure a ceiling structure the under or exposed surface of which presents a neat and attractive appearance. The ducts 40, 41 and 56 at the outer side of the fixture at one end of the respective rows thereof, in this case the outer end adjacent the building wall 58, may be closed by suitable caps 64 or in any suitable manner. The ducts of the respective rows of fixtures arranged end to end, starting with those at the inner side of the side to side row—adjacent wall 58—are connected by flexible conduits, duct 40 of the outer fixture being connected by a flexible conduit or sleeve 65 to duct 40 of the next adjacent fixture, duct 41 being connected by sleeve 66 to duct 41 of the next adjacent fixture, duct 56 being connected by sleeve 67 to duct 56 of the next adjacent fixture and so on. The ducts at the inner side of the fixtures adjacent the partition 61 are connected, by sleeves 65, 66 and 67, to branch air conduits 68, 69 and 70 suitably mounted in partition 61. The passages of each row of four fixtures extending across the room are thus connected in series, with similar passages connected to similar passages, the air supply passages 27 being connected to the branch conduit 68, the heated air passages 24 being connected to the branch conduit 69 and the room air return passages 43 being connected to the branch conduit 70. In like manner the passages of the fixtures at the opposite or inner side of the partition 61 are connected to the branch conduit 68, 69 and 70.

The branch conduits 68, 69 and 70 pass through a partition 72 into an equipment area or room 73. The room 73 is intended for accommodation of heating equipment including furnaces, boilers and the usual accessories, and cooling or refrigeration apparatus and the usual accessories, all of which may be of standard type and need not be shown nor described in detail. A main or trunk air conduit 74 is mounted in the equipment space 73 and opens at one end to atmosphere through the building wall 58 at one side thereof. The trunk conduit 74 is provided at its inner end with a suitable fan or blower, of any suitable type, including a housing 75 into which trunk conduit 74 opens, the discharge of outlet of housing 75 being connected to the branch conduit 68 for supplying air under pressure thereto. Trunk conduit 74 is provided with a preheater 76, a filter 77, a cooling coil 78 and a heating coil 79 mounted therein in the order stated and disposed in advance of the blower 75. The preheater 76 and the heating coil 79 may be of any suitable known type, preferably being steam coils, though electrical coils or any suitable heating means may be employed within the broader concept of my invention. The cooling coil 78 may be of any suitable type and receives a suitable coolant circulated therethrough in a known manner. Likewise the air filter 77 may be of any suitable known type. Preferably, the trunk conduit 74 is provided at its outer end with a damper 80 of suitable known type for controlling the effective area of the opening to atmosphere. The branch conduit 70 opens into trunk conduit 74 in advance of the preheater 76 and the branch conduit 69 opens into conduit 74 in advance of the branch conduit 70. Branch conduit 69 is provided with a fan or blower 81 mounted therein and discharging toward trunk conduit 74, branch conduit 69 being further provided with a damper 82 controlling communication thereof with trunk conduit 74. The branch conduit 69 is also provided, between the discharge side of blower 81 and the trunk conduit 74, with a branch or arm 83 opening to atmosphere adjacent the trunk conduit 74. Arm 83 is provided with a damper 84 for controlling the effective extent of opening thereof to atmosphere.

It will be understood that FIGURES 6 and 7 are, to a considerable extent, schematic views and the blowers and the heating and the cooling coils and associated parts are shown diagrammatically, sufficient for an understanding of my invention. During cool or cold weather, when it is desired to heat the interior of the building, with the damper 84 closed and the heating coils 76 and 79 heated to appropriate degree, with the cooling coil ineffective, air which has been heated by the lamps and the ballast and any other heat generating accessories associated therewith, is withdrawn through the passages 24 of the fixtures 10 into the conduit 74 and through the latter, by the blower 75, such air passing over and being heated by the coils 76 and 79. The heated air is delivered from the blower 75, through branch conduit 68 and passages 27 of the fixtures to the wells or collars 29 of the latter, from which the heated air is delivered, under control of the valve members 31 to the air supply chambers 21 and thence through the openings or slots 22 into the room to be heated. The air delivered to trunk conduit 74 from the branch conduit 69 is mixed with atmospheric air, in proportion determined by the adjustment of damper 80 and also mixes with room air returned, by means of the passages 43 and the branch conduit 70, to trunk conduit 74 in advance of the air heating means therein. The amount of air returned through the passages 43 of the fixtures 10 may be controlled by the dampers 44, as will be understood. That, in conjunction with control of the atmospheric air entering the trunk conduit 74 and the heated air delivered from branch conduit 69 to trunk conduit 74, renders it feasible to utilize to best advantage the heat contained in the room air and the heat generated by the lamps and associated parts for heating the building, while also providing for an adequate supply of fresh outside air at all times. During warm weather, when it is desired to cool the room or space underlying the ceiling of my invention, the heating coils 76 and 79 are rendered inactive and the cooling or refrigeration coil 78 is rendered active. By closing the damper 82, opening the damper 84 and setting the blower 81 in operation, the air heated by the lamps and associated parts or accessories of the fixtures may be discharged to atmosphere, thus eliminating that source of heat from the room. The room air withdrawn through the passages 43 and the branch conduit 70 is mixed in the trunk conduit 74 with atmospheric air in proportion determined by adjustment of the damper 80, the air mixture being then cooled to appropriate temperature by the cooling coil 78 and delivered to the room through branch conduit 68, as above explained, for cooling or air conditioning of the room.

In FIGURES 6 and 7 the ceiling is shown as formed of fixtures 10 disposed in abutting relation. Obviously, the ceiling may be formed of fixtures spaced apart, with the intervening spaces closed by panels of any suitable material, such as acoustic material, for example, the disposition of the fixtures depending upon lighting and air conditioning requirements and related factors. Accordingly, it will be understood that my invention comprehends a ceiling structure formed either in part or in whole of fixtures embodying my invention and arranged as desired to suit lighting and ventilating requirements.

It will be seen that by the system of my invention I utilize for heating, in cool or cold weather, the heat generated by the lamps and associated parts or accessories of the fixtures as well as the heat present in air withdrawn from the room, and in warm or hot weather, discharge to atmosphere the heat generated by the lamps and associated parts or accessories thereby effecting a corresponding saving in cost of cooling the air of the room being air conditioned. Briefly, by the system of my invention it is possible to separate the room supply air, the room return air and the lamp and ballast heated air in such manner that the heat generated by the lamps and ballast can be utilized during the winter for heating the building and can be exhausted to atmosphere during the summer, thus effecting a substantial saving in cost both in heating of the building in cold weather and in cooling or air conditioning thereof in warm weather. It has been calculated that in an average twenty story building measuring about sixty feet wide and one hundred feet long, with a lighting level of approximately one hundred and fifty foot candles, with a temperature of 0° F. outside, the sensible heat generated by the lamps and ballast is sufficient to satisfactorily heat the structure during the winter season. Also, by exhausting the lamp and ballast heat to atmosphere during the summer or cooling cycle of the building, a saving of approximately 40% of the refrigeration requirements can be effected. Accordingly, in a cooling installation normally requiring 500 tons of refrigeration it would only be necessary to purchase and install 300 tons. Based on an average installation cost of $1,000.00 per ton a saving of $200,000.00 can be effected, plus the savings in yearly operating costs of a 200 H.P. motor, larger fans, etc. Further, during the heating cycle, or cold weather, it would only be necessary to install boilers of actual required horsepower, with no provision for extra or standby boilers, due to the utilization of the lamp and ballast heat, as above. As a result, the fuel cost would be reduced from 60% to 80%. A saving of approximately $50,000.00 in cost of installation could be effected by elimination of necessity for having a standby boiler, and the savings in yearly fuel cost would be approximately $20,000.00. A further saving effected by the ceiling structure of my invention As above indicated, and as will be understood, changes in detail may be resorted to without departing from the field and scope of my invention, and I intend to include all such variations, as fall within the scope of the appended claims, in this application in which the preferred form only of my invention has been disclosed.

I claim:

1. In a fixture for a lighting and ventilating system; a housing structure substantially rectangular in plan; a downwardly opening shell in said housing structure comprising two light reflecting members substantially rectangular in plan spaced apart at their inner sides with a finishing strip of material width between them; and partitions in said housing defining therewith and with said shell a central air supply chamber in part overlying said shell and in part overlying said strip and having air discharge openings adjacent the inner sides of said reflecting members, a first transverse passage in part overlying and closed to said chamber and in part overlying said shell and opening into said reflecting members at the tops thereof for receiving therefrom lamp heated air, a second transverse passage overlying and closed to said first passage and extending approximately to the lower edges of the outer sides of said shell structure defining therewith slot like openings for admission of room air, and a third transverse passage overlying and closed to said second passage and having an air supply well extending therefrom to said chamber for supplying air thereto and closed to said first and second passages; said passages being further provided with individual air inlet and outlet ducts extending from the sides of said housing structure.

2. In a fixture for a lighting and ventilating system; a housing structure substantially rectangular in plan; a downwardly opening shell structure in said housing structure comprising two light reflecting members substantially rectangular in plan spaced apart at their inner sides with a finishing strip of material width between them; and partitions in said housing structure defining therewith and with said shell a central air supply chamber in part overlying said shell and in part overlying said strip and having air discharge openings adjacent the inner sides of said reflecting members, a first transverse passage in part overlying and closed to said chamber and in part overlying said shell and opening into said reflecting members at the tops thereof for receiving therefrom lamp heated air, a second transverse passage overlying and closed to said first passage and extending approximately to the lower edges of the outer sides of said shell structure defining therewith slot like openings for admission of room air, a third transverse passage overlying and closed to said second passage and having an air supply well extending therefrom to said chamber for supplying air thereto and closed to said first and second passages, and end compartments extending the interior width of said housing structure and of material extent lengthwise thereof; one of said end compartments having a bottom opening and an opening into said first passage, said end compartments being otherwise closed to said passages and the latter being provided with individual air inlet and outlet ducts extending from the sides of said housing structure.

3. In a fixture for a lighting and ventilating system; a housing structure substantially rectangular in plan; a downwardly opening shell structure in said housing structure comprising two light reflecting members substantially rectangular in plan spaced apart at their inner sides with a finishing strip of material width between them; and partitions in said housing structure defining therewith and with said shell a central air supply chamber in part overlying said shell and in part overlying said strip and having air discharge openings adjacent the inner sides of said reflecting members, a first transverse passage in part overlying and closed to said chamber and in part overlying said shell and opening into said reflecting members at the tops thereof for receiving therefrom lamp heated air, a second transverse passage overlying and closed to said first passage and extending approximately to the lower edges of the outer sides of said shell structure defining therewith slot like openings for admission of room air, a third transverse passage overlying and closed to said second passage and having an air supply well extending therefrom to said chamber for supplying air thereto and closed to said first and second passages, and end compartments extending the interior width of said housing structure and of material extent lengthwise thereof; one of said end compartments having a bottom opening and an opening into said first passage, said end compartments being otherwise closed to said passages and the latter being provided with individual air inlet and outlet ducts extending from the sides of said housing structure, said slot like openings of said second passage terminating at the inner ends of said end compartments.

4. In a fixture for a lighting and ventilating system; a housing structure substantially rectangular in plan; a downwardly opening shell structure in said housing structure comprising two light reflecting members substantially rectangular in plan spaced apart at their inner sides with a finishing strip of material width between them; and partitions in said housing structure defining therewith and with said shell a central air supply chamber in part overlying said shell and in part overlying said strip and having air discharge openings adjacent the inner sides of said reflecting members, a first transverse passage in part overlying and closed to said chamber and in part overlying said shell and opening into said reflecting members at the tops thereof for receiving therefrom lamp heated air, a second transverse passage overlying and closed to said first passage and extending approximately to the lower edges of the outer sides of said shell structure defining therewith slot like openings for admission of room air, a third transverse passage overlying and closed to said second passage and having an air supply well extending therefrom to said chamber for supplying air thereto and closed to said first and second passages, and end compartments extending the interior width of said housing structure and of material extent lengthwise thereof; and a deflector of substantially inverted V-shape in cross section secured to the inner ends of said end compartments and the upper face of said finishing strip between said air discharge openings and defining with the inner side portions of said reflecting members downwardly converging air discharge channels; one of said end compartments having a bottom opening and an opening into said first passage; said end compartments being otherwise closed to said passages and the latter being provided with individual air inlet and outlet ducts extending from the sides of said housing structure; said slot like openings of said second passage terminating at the inner ends of said end compartments.

5. In a fixture for a lighting and ventilating system; a housing structure substantially rectangular in plan; a downwardly opening shell structure in said housing structure comprising two light reflecting members substantially rectangular in plan spaced apart at their inner sides with a finishing strip of material width between them; and partitions in said housing structure defining therewith and with said shell a central air supply chamber in part overlying said shell and in part overlying said strip and having air discharge openings through the latter adjacent the inner sides of said reflecting members, a first transverse passage in part overlying and closed to said chamber and in part overlying said shell and opening into said reflecting members at the tops thereof for receiving therefrom lamp heated air, a second transverse passage overlying and closed to said first passage and extending approximately to the lower edges of the outer sides of said shell structure defining therewith slot like openings for admission of room air, a third transverse passage overlying and closed to said second passage and having an air supply well extending therefrom to said chamber for supplying air thereto and closed to said first and second passages, and end compartments extending the interior width of said housing structure and of material extent lengthwise thereof; a deflector of substantially inverted V-shape in cross section secured to the inner ends of said end compartments and the upper face of said finishing strip between said air discharge openings and defining with the inner side portions of said reflecting members downwardly converging air discharge channels; one of said end compartments having a bottom opening and an opening into said first passage; said end compartments being otherwise closed to said passages and the latter being provided with individual air inlet and outlet ducts extending from the sides of said housing structure, said slot like openings of said second passage terminating at the inner ends of said end compartments; and valve means for controlling flow of air from said well into said air supply chamber comprising an adjusting member mounted on said deflector.

6. In a lighting and ventilating system, a plurality of fixtures having lamps mounted therein and overlying a room to be air conditioned, said fixtures respectively comprising a first passage receiving lamp heated air, a second room air return passage receiving air from said room, and a third air supply passage with means for delivering air therefrom to said room, said passages being separate one from the other, a first branch air conduit connected to said first passages of said fixtures, a second branch air conduit connected to said second passages of said fixtures, a third branch air conduit connected to said third passages of said fixtures, a main air conduit, and blower means for causing flow of air through said main conduit toward one end thereof, said first and second branch conduits opening into said main conduit in advance of said blower means and said third branch conduit opening into said main conduit beyond said blower means.

7. In a lighting and ventilating system, a plurality of fixtures having lamps mounted therein and overlying a room to be air conditioned, said fixtures respectively comprising a first passage receiving lamp heated air, a second room air return passage receiving air from said room, and a third air supply passage with means for delivering air therefrom to said room, said passages being separate one from the other, a first branch air conduit connected to said first passages of said fixtures, a second branch air conduit connected to said second passages of said fixtures, a third branch air conduit connected to said third passages of said fixtures, a main air conduit having an opening to atmosphere, and blower means for causing flow of air through said main conduit from said opening, said first and second branch conduits opening into said main conduit in advance of said blower means and said third branch conduit opening into said main conduit beyond said blower means.

8. In a lighting and ventilating system, a plurality of fixtures having lamps mounted therein and overlying a room to be air conditioned, said fixtures respectively comprising a first passage receiving lamp heated air, a second room air return passage receiving air from said room, and a third air supply passage with means for delivering air therefrom to said room, said passages being separate one from the other, a first branch air conduit connected to said first passages of said fixtures, a second branch air conduit connected to said second passages of said fixtures, a third branch air conduit connected to said third passages of said fixtures, a main air conduit having an opening to atmosphere, means for adjusting the effective size of said opening to variable extent, and blower means for causing flow of air through said main conduit from said opening, said first and second branch conduits opening into said main conduit in advance of said blower means and said third branch conduit opening into said main conduit beyond said blower means.

9. In a lighting and ventilating system, a plurality of fixtures having lamps mounted therein and overlying a room to be air conditioned, said fixtures respectively comprising a first passage receiving lamp heated air, a second room air return passage receiving air from said room, and a third air supply passage with means for delivering air therefrom to said room, said passages being separate one from the other, a first branch air conduit connected to said first passages of said fixtures, a second branch air conduit connected to said second passages of said fixtures, a third branch air conduit connected to said third passages of said fixtures, a main air conduit having an opening to atmosphere, blower means for causing flow of air through said main conduit from said opening, and means for discharging air from said first branch conduit into said main conduit in advance of said blower means and to atmosphere optionally, said second branch conduit opening into said main conduit in advance of said blower means, and said third branch conduit opening into said main conduit beyond said blower means.

10. In a lighting and ventilating system, a plurality of fixtures having lamps mounted therein and overlying a room to be air conditioned, said fixtures respectively comprising a first passage receiving lamp heated air, a second room air return passage receiving air from said room, and a third air supply passage with means for delivering air therefrom to said room, said passages being separate one from the other, a first branch air conduit connected to said first passages of said fixtures, a second branch air conduit connected to said second passages of said fixtures, a third branch air conduit connected to said third passages of said fixtures, a main air conduit having an opening to atmosphere and provided with air heating means and air cooling means spaced from said opening, blower means for causing flow of air through said main conduit from said opening toward one end thereof and in heat exchange contact with said heating and cooling means, and means for discharging air from said first branch conduit into said main conduit in advance of said blower means and said heating and cooling means and to atmosphere optionally, said second branch conduit opening into said main conduit in advance of said blower means and said heating and cooling means, and said third branch conduit opening into said main conduit beyond said blower means and said heating and cooling means.

11. In a lighting and ventilating system, a ceiling structure comprising a plurality of fixtures having lamps therein and arranged in rows sidewise, said ceiling structure overlying a room to be air conditioned and said fixtures respectively comprising a first transverse passage receiving lamp heated air, a second transverse room air return passage receiving air from said room, and a third air supply passage with means for delivering air therefrom to said room, said passages being separate one from the other and respectively provided with air inlet and outlet ducts extending from the sides of said fixtures with the ducts of corresponding passages of the fixtures of said rows connected in series, a first branch air conduit connected to the ducts of said first passages of the last row of said fixtures at the outer side thereof, a second branch air conduit connected to the ducts of said second passages of the last row of fixtures at the outer side thereof, a third branch air conduit connected to the ducts of said third passages of the last row of fixtures at the outer side thereof, a main air conduit, and blower means for causing flow of air through said main conduit toward one end thereof, said first and second branch conduits opening into said main conduit in advance of said blower means and said third branch conduit opening into said main conduit beyond said blower means.

12. In a lighting and ventilating system, a ceiling structure comprising a plurality of fixtures having lamps therein and arranged in rows sidewise, said ceiling structure overlying a room to be air conditioned and said fixtures respectively comprising a first transverse passage receiving lamp heated air, a second transverse room air return passage receiving air from said room, and a third air supply passage with means for delivering air therefrom to said room, said passages being separate one from the other and respectively provided with air inlet and outlet ducts extending from the sides of said fixtures with the ducts of corresponding passages of the fixtures of said rows connected in series, a first branch air conduit connected to the ducts of said first passages of the last row of said fixtures at the outer side thereof, a second branch air conduit connected to the ducts of said second passages of the last row of fixtures at the outer side thereof, a third branch air conduit connected to the ducts of said third passages of the last row of fixtures at the outer side thereof, a main air conduit having an opening to atmosphere and provided with air heating means and air cooling means, blower means for causing flow of air through said main conduit from said opening toward one end thereof and in heat exchange contact with said heating and cooling means, and means for discharging air from said first branch conduit into said main conduit in advance of said blower means and said heating and cooling means and to atmosphere optionally, said second conduit opening into said main conduit in advance of said blower means and said heating and cooling means, and said third branch conduit opening into said main conduit beyond said blower means and said heating and cooling means.

13. In a fixture for a lighting and ventilating system; a downwardly opening housing; a downwardly opening shell in said housing comprising two light reflecting members spaced from each other and from said housing; and partitions in said housing between the latter and said shell defining therewith a central air supply chamber in part overlying said shell and opening downwardly between said reflecting member, a first transverse passage in part overlying and closed to said chamber and in part overlying said shell and opening into said shell for receiving therefrom lamp heated air, a second transverse passage overlying and closed to said first passage and extending approximately to the lower edges of the sides of said shell defining therewith slot like openings for admission of room air, and a third transverse passage overlying and closed to said second passage and having an air supply well extending therefrom to said chamber for supplying air thereto and closed to said first and second passages; said passages being further provided with individual air inlet and outlet ducts extending from said housing.

References Cited in the file of this patent

UNITED STATES PATENTS

| | | |
|---|---|---|
| 2,255,849 | Kurth | Sept. 16, 1941 |
| 2,318,393 | Honerkamp et al. | May 4, 1943 |
| 2,564,334 | Kennedy | Aug. 14, 1951 |
| 2,593,094 | Blue | Apr. 15, 1952 |
| 2,845,855 | Burns | Aug. 5, 1958 |